Patented May 21, 1940

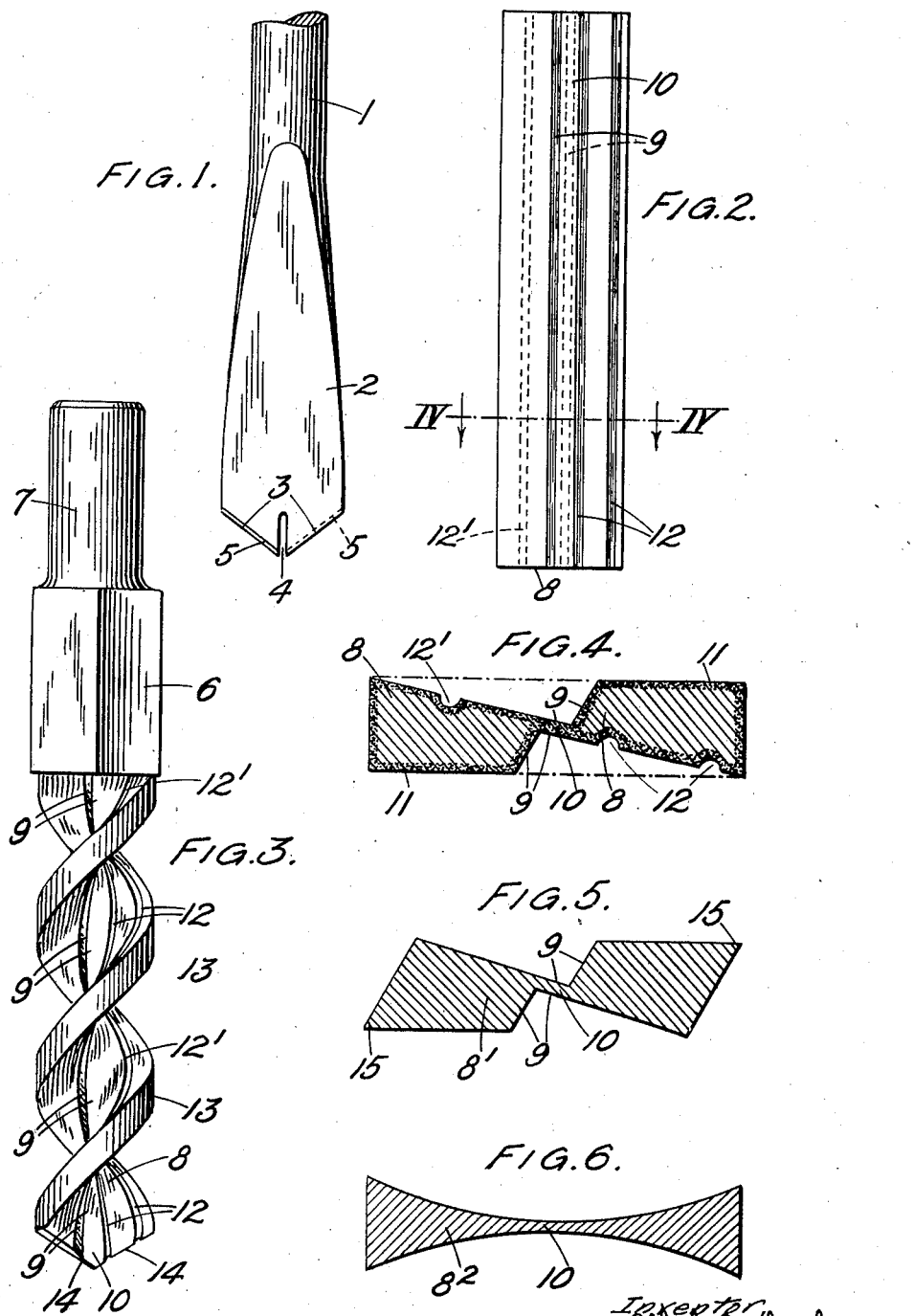

2,201,159

UNITED STATES PATENT OFFICE 2,201,159

BORING OR DRILLING TOOL

Alfred Cecil Clow, Greenwich, London, England, assignor to Philplug Products Limited, Perivale, Greenford, Middlesex, England, a company Application April 22, 1938, Serial No. 203,707
In Great Britain May 10, 1937

2 Claims. (Cl. 255—61)

This invention relates to boring or drilling tools such as are intended more especially for drilling masonry, brickwork and the like.

The object of the invention is to provide an improved tool and a simple and inexpensive method of producing same.

According to one feature of the invention a boring or drilling tool comprises a low-carbon or mild steel bit having a case-hardened surface.

Another feature is a method of producing a boring or drilling tool comprising forming the bit from a low-carbon or mild steel and subjecting the bit to a case-hardening operation.

Other features of the invention will become apparent from the following description of some ways in which it may be carried into effect, given by way of example only, reference being had to the accompanying drawing, wherein:

Fig. 1 is a side elevation of the operative end of one form of drill bit,

Fig. 2 is a similar view of the blank employed in the production of a second form of drill bit, and Fig. 3 is a side elevation of the complete bit, Fig. 4 is a section, to a larger scale, taken on the line IV—IV of Fig. 2, and Figs. 5 and 6 are similar views showing modifications.

In the example of Fig. 1 a drill bit is formed from a length of mild steel rod 1 by flattening the operative end to a spatulate form as at 2, trimming the end to V-shape as at 3, slotting the flattened end transversely and axially from the apex as at 4 and case-hardening the whole bit. The end faces 5 of the two cutting parts formed by the slotting operation are then ground, preferably at an inclination to the side faces (as shown) so that each part is of wedge shape in longitudinal transverse section, to remove the case-hardened skin from the said end faces.

The drill bit is then ready for use and may be re-sharpened at any time by means of an ordinary file while always presenting extremely hard cutting faces. The shank of the bit may be shaped, prior to the hardening, to present both a squared section 6 and a cylindrical section 7 (as indicated for the shank shown in Fig. 3) so that it may be engaged in any of the breast drill or brace chucks usually employed.

Another and preferred type of drill bit, illustrated in Fig. 3, is produced from a flat mild steel strip 8 (see chain-dotted lines in Fig. 4). The strip 8 is formed with longitudinally extending grooves 9 in one or (as shown) both of the wider faces. These grooves are at such locations and of such a depth that there only remains centrally of the strip 8 a band of metal 10 of a thickness approximately equal to twice the thickness of the case-hardened skin 11 later to be formed on the bit. Each groove 9 is shown as of unsymmetrical V-section with the deepest part located to one side of the centre-line of the bit. The strip 8 is then preferably formed with one or more shallower and narrower grooves 10 extending longitudinally of the wider faces of the grooves 9. In the example two grooves 12 are formed in one such face and one groove 12' in the other, the grooves 12, 12' being staggered relatively to each other when considered from the point of view of rotation about the centre-line of the bit. The strip 8 is then twisted about its longitudinal axis into a helix of comparatively fast pitch as shown at 13 in Fig. 3 and the operative end of the bit is trimmed to V-shape as at 14. The bit is subsequently case-hardened to a depth (indicated at 11 in Fig. 4) such that the reduced centre portion 10 thereof is hardened throughout its thickness and finally the operative end faces 14 of the bit are ground as described with reference to Fig. 1.

The primary grooving of the strip 8 may alternatively be effected in such manner that two symmetrical V-section grooves are formed one in each face of the strip although a single and deeper V-section groove may be formed in one only of said faces.

Furthermore, although a strip 8 of initially oblong section has been described, the whole or part of the shaping may be effected prior to twisting by a rolling or like operation. It may be advantageous in some cases to employ a strip 8' (shown in Fig. 5) having a section of parallelogram form, the acute-angled corners 15 being the leading corners when the bit is being used. Again, for greater strength in the finished bit, a strip $8^2$ (Fig. 6) may be employed which has both wider faces of transversely concave form and is of the requisite thickness at the centre 10, i. e., twice the thickness of the case-hardened skin to be formed on the bit.

The shank end of the bit may be butt-welded to a shank of square or cylindrical section or, preferably, to a shank exhibiting portions 6, 7 of each section as shown in Fig. 3. Alternatively the shank end may be left untwisted for a portion of its length and built up to the desired section by securing further strips to its wider faces.

Drill bits in accordance with the invention have numerous advantages, among others that they are not liable to fracture during use, are cheap to produce, require no tempering, present extremely hard cutting edges and yet may be easily resharpened with the aid of a file. This latter is due to the fact that the case-hardened skin may be broken away by an ordinary file as the softer mild steel body portion is gradually filed away. The band 10 of metal which is hardened throughout is found to break away somewhat during the use of the drill, thus imparting the characteristics of a "slotted point" to the latter.

It is to be understood that other methods may be employed for producing the "twisted" bits such as helically grooving a cylindrical rod and subsequently forming a longitudinally extending central groove or grooves in one or more of the bases of the helical grooves.

What I claim is:

1. A boring or drilling tool composed of a case-hardened length of helically twisted mild steel strip having a central longitudinally extending band of metal which is comprised between the walls of longitudinal grooves formed one in each of the wider faces of the strip and is of a thickness approximately equal to twice the thickness of the case-hardened skin on the surface of the tool and ground operative end faces one on each side of the said central band which are each composed of a central mild steel portion bounded by marginal case-hardened portions.

2. A tool as claimed in claim 1, having at least one further longitudinal groove formed in a wall of each said longitudinal groove.

ALFRED CECIL CLOW.